United States Patent [19]

Tuomala

[11] 3,820,805
[45] June 28, 1974

[54] CONVERTIBLE ICE HOUSE-SNOW SLED COMBINATION

[76] Inventor: Matt E. Tuomala, 515 First St., Nashwauk, Minn. 55769

[22] Filed: June 19, 1972

[21] Appl. No.: 263,758

[52] U.S. Cl. .............................................. 280/12 S
[51] Int. Cl. ............................................ B62b 13/16
[58] Field of Search..... 280/12 R, 12 F, 12 S, 12 A, 280/12 C, 12 L, 18, 19, 20, 24

[56] References Cited
UNITED STATES PATENTS

| | | | |
|---|---|---|---|
| 2,301,089 | 11/1942 | Stevens | 280/20 UX |
| 2,464,884 | 3/1949 | Noyes | 280/12 S |
| 2,546,588 | 3/1951 | Ellis | 280/20 |
| 2,717,160 | 9/1955 | Schmidt | 280/20 |
| 2,737,397 | 3/1956 | Turner | 280/12 S |
| 3,030,122 | 4/1962 | Madera | 280/12 C |
| 3,348,247 | 10/1967 | Flannigan | 280/12 R |
| 3,492,015 | 1/1970 | Kuhn | 280/12 R |

Primary Examiner—David Schonberg
Assistant Examiner—Reinhard J. Eisenzopf
Attorney, Agent, or Firm—Larson, Taylor & Hinds

[57] ABSTRACT

A kit assembly for a combination ice house and snow sled enables rapid construction of either or conversion of one from the other with a minimum of left over parts and without the use of bolts and the like. The assembly includes two pairs of runners which are used to construct the framework of the ice house, one pair also being used as the sled runners. A hinged two-section floor for the ice house is folded together to form a seat for the sled. The sled also includes H-shaped standards the lower ends of which are received in sockets or sleeves welded to the runners and the upper ends of which extend through aligned apertures in the seat. A carrying compartment for the sled is formed by end and side panels the latter of which include brackets through which the upper ends of the standards extend.

10 Claims, 7 Drawing Figures

PATENTED JUN 28 1974 3,820,805
SHEET 1 OF 2
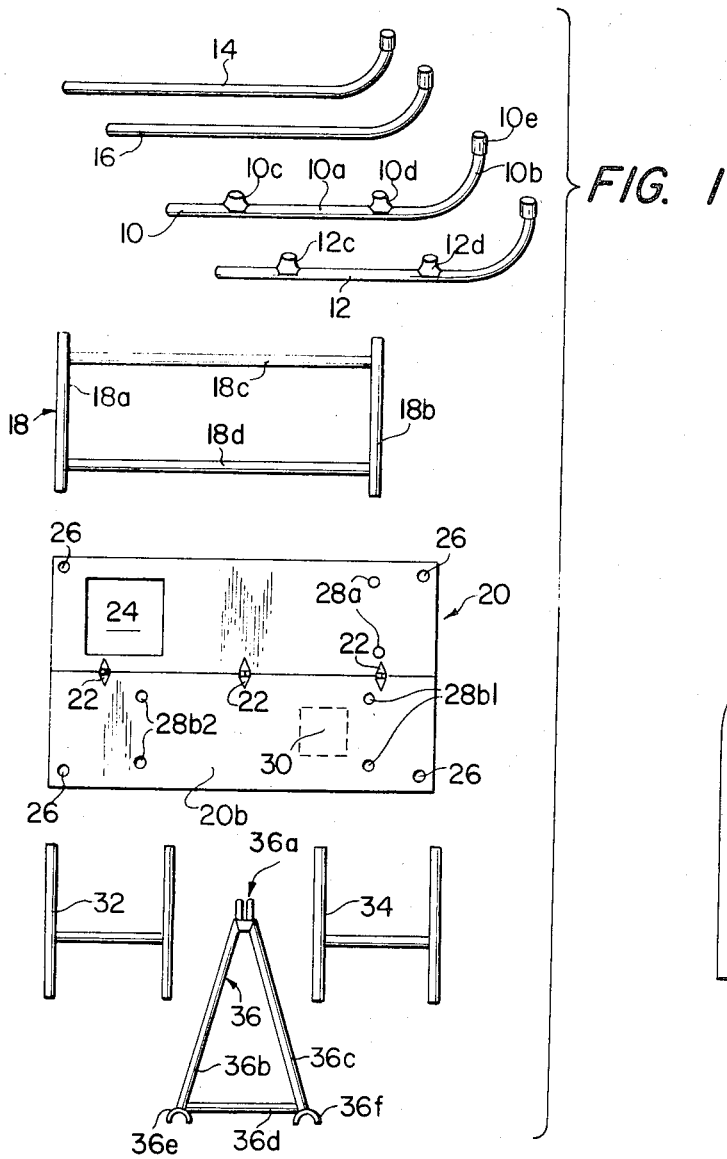
FIG. 1
FIG. 3
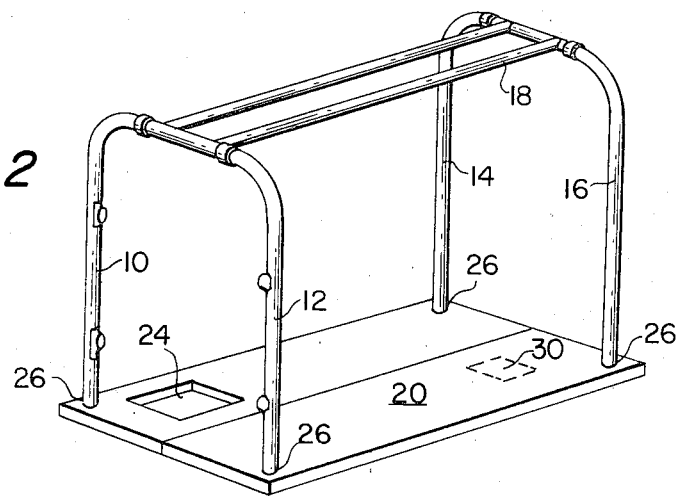
FIG. 2

3,820,805

1

CONVERTIBLE ICE HOUSE-SNOW SLED COMBINATION

FIELD OF THE INVENTION

The present invention relates to fishing shelters and, more particularly, to convertible shelter-sled combinations.

BACKGROUND OF THE INVENTION

Ice fishing for extended periods is decidedly more comfortable when carried on from within a shelter or ice house. However, because of the remote locations of some fishing grounds, the transporting of a suitable shelter to the fishing grounds presents problems. Because of this and other reasons, a number of knockdown shelter-sled combinations and portable shelters with runners have been developed which permit relatively easy transportation of the shelter to the desired locale and which enable relatively rapid erection of the shelter.

However, the devices of the prior art adapted for this purpose suffer a number of important disadvantages. More specifically, many of the sled designs are simply unsuitable for use in heavy snow and over rugged terrain. Further, prior art devices are, in general, simply too complicated to appeal to the prospective user. In this regard, some such devices require a relatively large number of bolts and other fasteners in constructing the shelter and this, of course, adds significantly to the time necessary to erect the shelter as well as to the complexity and expense. Further, although some such devices utilize components or parts in common for the sled and shelter, in prior art constructions only a few components are common to both and a substantial number of further components are required to complete both the sled and the shelter. On the other hand, in other devices either the sled, or the shelter, or both, are so crude as to be practically unusable under many conditions. Further, some of the shelters are also so small as to be unusable while the components of others, even after being broken down, are too large for transportation by automobile.

Reference is made to U.S. Pat. Nos. 2,546,588; 2,737,397; 2,780,471; and 3,492,015, for examples of prior art devices of the type under discussion.

SUMMARY OF THE INVENTION

In accordance with the invention a convertible fishing shelter or ice house-snow sled combination is provided which is superior to prior devices from standpoints of simplicity, utility, versatility and economy. The sled of the combination provides minimum resistance when pulled through snow, is capable of use in rough terrain and includes a rugged carrying compartment which provides a substantial load carrying capacity when pulled behind a snow machine (which is of particular importance when traveling great distances in the wilderness because of the attendant need for extra gasoline and supplies). The shelter is also quite roomy. The sled can be assembled and disassembled in less than a minute and the ice house can be assembled and disassembled in a very short time as well. Further, the assembly of both is completed without the use of a single bolt apart from attaching a trailer hitch to the sled.

In addition, despite the size of the shelter and the advantages of the sled the entire kit assembly used in constructing the sled and shelter can be readily transported by automobile. Finally, although this discussion should not be taken as exhaustive, the number of parts required is few and the principal parts are common to both the sled and shelter.

The kit assembly for the convertible shelter-sled combination basically comprises a pair of H-shaped standards, a first pair of runners each including a pair of slip-in coupling devices secured at spaced locations along the length thereof and adapted to receive the ends of the standards to form a sled framework, a second pair of runners which, together with the first pair, forms the framework for the shelter, a two-section base member which when opened forms the floor of the shelter and which is foldable to form the seat of the sled, and a connecting member for completing the shelter frame. The sections of the base member includes apertures or holes which are aligned or matched when the base member is folded to form the seat and through which the upper ends of the standards extend. The sled preferably includes a box-like carrying compartment including side panels having brackets or rings through which the standards extend so as to form a rigid structure.

A number of further important features and advantages of the invention are set forth in, or will be apparent from, the detailed description of a presently preferred embodiment found hereinbelow.

BRIEF DESCRIPTION OF THE DRAWINGS

FIG. 1 is a plan view of the basic elements of a kit used in constructing a convertible ice house or fishing house-snow sled;

FIG. 2 is a perspective view of the framework for an ice house constructed from the kit of FIG. 1;

FIG. 3 is a front elevational view of the completed ice house;

DESCRIPTION OF A PREFERRED EMBODIMENT

Figure 4:
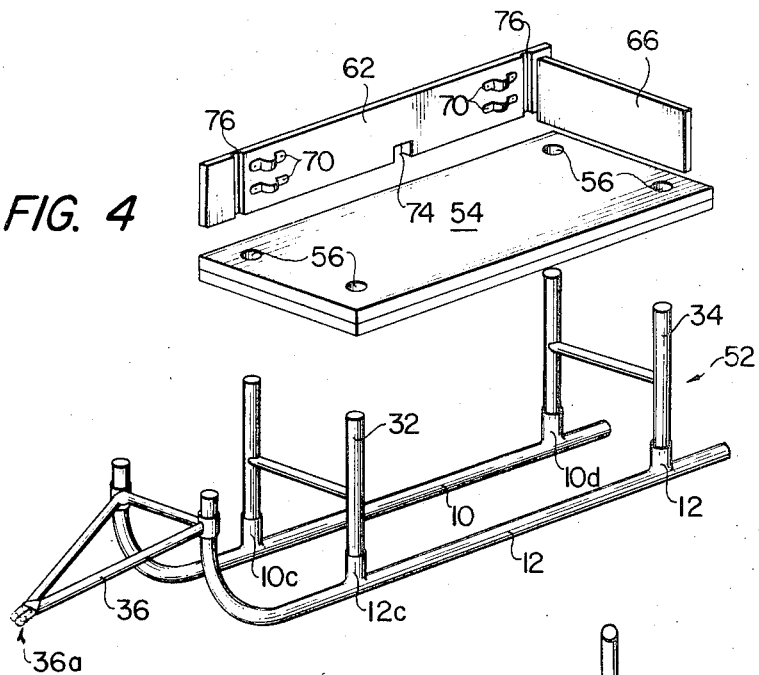
FIG. 4 is an exploded perspective view of a sled constructed from the kit of FIG. 1.

As discussed hereinabove, the kit assembly of the invention enables construction of either an ice house or a snow sled, or stated somewhat differently, the ice house of the invention is convertible into a snow sled and vice versa. For this reason the basic elements of the assembly will be considered first, followed by a consideration of the two structures which are built therefrom.

Thus, referring to FIG. 1, the basic elements of the kit assembly are shown. These elements include a first pair of runners 10 and 12 which, as explained below, serve as part of the framework for an ice house as well as runners for a sled. The construction of runner 10, which is exemplary of both runners, includes an elongate straight section 10a and a bowed or curved section 10b. Intermediate the ends of straight section 10a, spaced therealong, are first and second "slip-in" coupling devices 10c and 10d which, in accordance with a preferred embodiment, comprise tubular sockets welded or otherwise affixed to section 10a. Finally, a further slip-in coupling device or coupling 10e is brazed to the free end of curved section 10b. The assembly also includes an auxiliary pair of runners individually denoted 14 and 16 used in constructing the framework for the ice house and, if desired, as an extra pair of runners for the sled. In a simplified embodiment, the runners 14, 16 are used for the first purpose only and hence coupling devices corresponding to sockets 10c and 10d may be omitted as shown. All of the runners have a large 90° curve which reduces friction when used with the sled. In an exemplary embodiment the runners are approximately 76½ inches long and the curve begins 27 inches from the end.

The kit assembly of FIG. 1 also includes a connecting frame member or roof member 18 used exclusively in constructing the ice house. Frame member 18 comprises first and second spaced parallel tubular or rod-like end portions 18a and 18b joined by a pair of side portions 18c 18d.

A two-section base member 20 is used in both the sled and ice house. Base 20 includes a first generally rectangular section 20a joined by a plurality of hinges 22 to a second, substantially identically shaped section 20b to permit folding thereof to form a seat for the sled, base 20, when unfolded, forming the floor of the ice house. Section 20a includes an enlarged, generally square or rectangular opening 24 which serves as a fishing hole in the ice house whereas sections 20a and 20b both include smaller, generally circular openings 26 at the corners thereof remote from the other section, as shown. Section 20a includes a second set of circular openings 28a spaced inwardly from the edges thereof, as illustrated, whereas, similarly, section 20b includes two sets of such apertures 28b1 and 28b2. Apertures 28b2 align with apertures 28a when sections 20a and 20b are folded together forming a continuous opening through the seat formed by the folded sections, for purposes discussed below, whereas apertures 28b2 cooperate with opening 24 in a similar manner for the same purpose.

Figure 7:
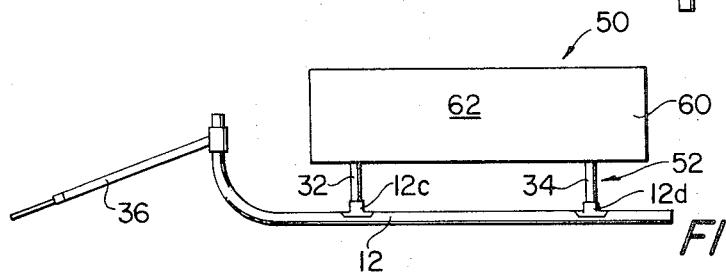
FIG. 7 is a side elevational view of the completed sled.

A pair of H-shaped standards 32 and 34 are used in constructing the sled and a triangular coupling member or trailer hitch 36 adapted for connection to the upper part or portion of runners 10 and 12 (see FIG. 4) serves in connecting the sled to a snowmobile or the like through a swivel hitching device represented by member 36a located at the apex of a pair converging arms 36b and 36c. The other ends of arms 36b and 36c are spaced apart and joined by a cross bar 36d and a pair of simple connector sleeves 36e and 36f permit hitch 36 to be connected to runners 10 and 12 at the upper parts of the curved portions thereof through bolts (not shown) which extend through holes in these curved portions as shown in FIGS. 4 and 7.

Referring to FIG. 2, the framework for an ice house, generally denoted 40, is shown. As mentioned above, the floor of the ice house 40 is formed by base member 20, when unfolded or opened, aperture 24 serving as a spearing or fishing hole. The curved frame members or runners 10, 12, 14 and 16 are inserted in holes 26 in the corners of base member 20 to form the side frames of the ice house 40. The roof of the house is formed by roof member 18 the free ends of which are inserted into couplings, corresponding to coupling 10e described above, located at the curved ends of the frame members 10, 12, 14 and 16. Thus, a complete house frame is quickly and easily erected by these simple steps. To complete the house, a canvas covering 42 (see FIG. 3) having a curved seam to fit the curved edge of the framework is fitted over the framework with a zipper opening 44 perpendicular to the hinged centerline of base or floor section 20. Slotted grommets (not shown) are inserted over eye-screws (not shown) on the outside edge of the floor section 20 to secure the canvas covering 42 to the frame. The covering 42 may also include 6-inch flaps (not shown) which may be covered with snow to eliminate light under the floor section. A stove, the chimney of which, denoted 46, is shown in FIG. 3, can be installed at a location indicated at 30, with the chimney 46 extending through an opening (not shown) in the covering 42 designed for this purpose and having a metal collar.

Referring to FIGS. 4 to 7, the base frame 52 of a sled, generally denoted 50, is formed by runners 10 and 12 and H-shaped standards 32 and 34. In particular, the lower ends of the vertical legs or uprights of standards 32 and 34 are inserted to the couplings 10c and 10d and 12c and 12d as shown in FIG. 4. The width of the standards 32 and 34 are such that the runners 10 and 12 will follow in the tracks of the towing vehicle. This width is 22¾ inches in an exemplary embodiment. The standards 32 and 34 are reversible, i.e., can be turned up side down so as to provide relatively high clearance, e.g., 14 inches, for pulling through deep snow or lower clearance, and hence more stability, when the sled 50 is pulled by a snow machine at high speeds.

Figure 5:
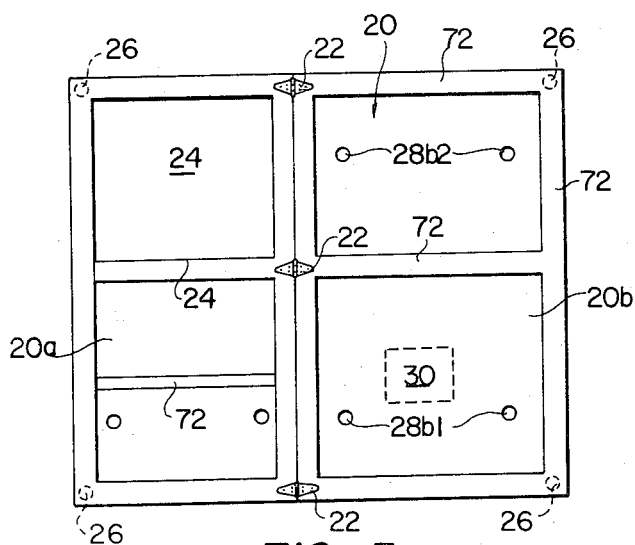
FIG. 5 is a plan view of the other side of the base member of FIG. 1, shown in the unfolded or open state.
Figure 6:
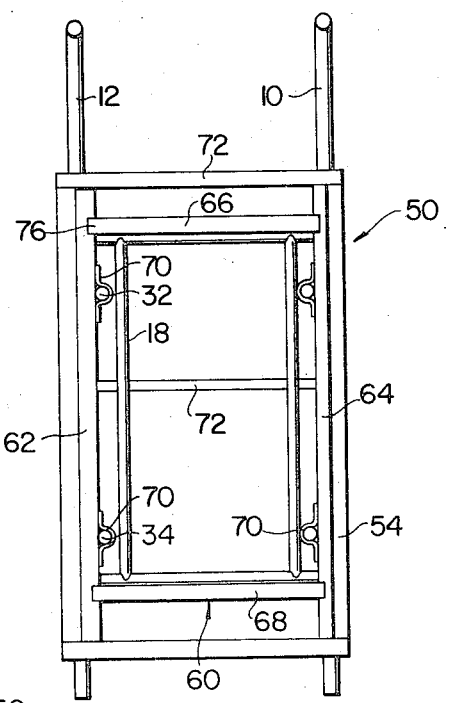
FIG. 6 is a plan view of the completed sled of FIG. 4.

The high surface of base section 20 opposite hinges 22 is shown in FIG. 5. With section 20a folded under, a seat 54 for the sled 50 is formed. As stated hereinabove with sections 20a and 20b folded together, apertures 28a in section 20a will be aligned with apertures 28b1 in section 20b and spearing hole 24 in section 20a will be aligned with apertures 28b2. The aligned holes so formed are denoted 56 and serve as openings through which the uprights of standards 32 and 34 are received. Hence, by folding up base member 20 and lowering it down onto the base framework 52 so that the uprights extend through the apertures 56, the seat 54 for the sled 50 is formed. The seat 54 is pressed down on standards 32 and 34 so that the bottom thereof contacts the cross bars of standards 32 and 34 to form a strong, rigid sled structure. A box-like cargo carrying structure 60 (see FIGS. 6 and 7) is formed on top of the seat 58 by side panels 62 and 64 and front panels 66 and 68. As shown in FIG. 6 (and in FIG. 4 for panel 62) side panels 62 and 64 each include two pairs of clamps or brackets 70 which are secured to the inner walls thereof and through which the uprights of standards 32 and 34 extend. As shown in FIG. 5, the base section 20 may be reinforced at the edges and at spaced locations with reinforcing strips or frame members, corresponding to those indicated at 72, and to accommodate the central cross member 72, the lower edges of side panels 62 and 64 may be notched as indicated at 74 in FIG. 4. This construction prevents any longitudinal movement of the side panels 62, 64. Side panels 62 and 64 also include vertical cheated slots 76 in the inner wall surfaces thereof which are adapted to receive end boards or panels 66 and 68 as shown in FIG. 6. The end boards 66, 68 force the side panels 62, 64 against the edge frame members 70 to provide further structural rigidity. Thus, with the upper ends of standards 32 and 34 inserted through brackets 68 attached to side panels 62 and 64 and the lateral ends of end boards 66 and 68 received in the vertical slots 76 in side panels 62 and 64, a rigid, strong but lightweight box is formed which provides room for all necessary gear as well as a passenger or two. As shown in FIG. 6, the connecting frame member 18 for the ice house may be readily stored in box 60. The trailer hitch 36 is, as described above, bolted to sled 50 through holes located somewhat below (approximately 4 inches in an exemplary embodiment) the ends of the runners 10 and 12. The other end of hitch 36, of course, connects sled 50 to a snow machine.

As stated hereinabove, the entire sled 50, complete with box 60, can be assembled or disassembled in less than one minute. Further, the assembly of both the fish house 40 and sled 50 is effected without the use of a single bolt apart from attaching the trailer hitch 26 to the sled 50. In an exemplary embodiment, the house 40 is 5 feet square when erected and provides a clearance of 5 feet 9 inches, and thus is roomy enough for two or three persons as well as a stove.

It will be understood by those skilled in the art that other variations and modifications can be effected in the exemplary embodiment without departing from the scope and spirit of the invention.

I claim:

1. A convertible ice shelter-snow sled kit assembly comprising a pair of H-members; a first pair of runners each including an elongate straight portion and a curved end portion, each of said first pair of runners further including coupling members spaced along and located intermediate the ends of said elongate portion for receiving the ends of the H-members therein so to form a sled frame; a second pair of runners each including an elongate straight portion and a curved end portion; a frame support including first and second spaced parallel frame members and at least one connecting member for joining said frame members, the ends of said first and second frame members being attachable to the free ends of the curved portions of said first and second pairs of runners to form a shelter frame for supporting a cover, and first and second base members and means for joining said base members together to permit folding of one on top of the other to form a seat for the sled and opening of the members to form a floor surface for the ice house upon which said shelter frame is disposed.

2. A sled capable of conversion to an ice house comprising first and second upright H-members including vertical side portions and a horizontal connecting portion, first and second runners each including an elongate straight portion, a curved end portion and first and second coupling devices, secured to and spaced apart along said straight portion, for detachably mounting said H-members in an upright position on said runners to form a sled framework, a hinged two-section base member folded with one section on top of the other and mounted on the connecting portions of the H-member to form a sled seat, each section of said base member including plurality of sets of holes therein which align with corresponding holes in the other section and through which the upper parts of the vertical side portions of the H-members extend, and an open carrier compartment mounted on said seat comprising a pair of detachable side panels and a pair of detachable end panels, each of at least one pair of said panels including means for securing said panels to said upper parts of said H-members, said base member including means at the four corners thereof for, when said base member is unfolded, receiving the free ends of the straight portions of said first and second runners, and the free ends of the straight portions of an auxiliary pair of runners, so as to support the runners in an upright position whereby by joining the pairs of runners together with a connecting member an ice house framework is formed, the unfolded sections of the base forming the floor of the ice house.

3. A sled as claimed in claim 2 wherein one of the sections of said base includes an enlarged opening therein which is aligned with the holes in the other section and which serves as a fishing hole in the floor of the ice house when the base is unfolded.

4. A sled as claimed in claim 3 wherein the side panels include brackets through which said upper parts of said H-members extend so as to secure the side panels to the H-members, said side panels further including vertical grooves in the inner surfaces thereof in which the ends of said end panels are received.

5. A sled as claimed in claim 4 wherein said seat includes a raised reinforcing framework and said side panels each include at least one notch in the lower edge thereof in which a laterally extending portion of said framework is received.

6. A sled as claimed in claim 2 wherein the curvature of the curved end portions of said runners comprises a 90° curve.

7. A sled as claimed in claim 2 wherein the portions of the legs of each of said H-members above and below the connecting portions are of different lengths so that by turning the H-members upside down the height of the seat above the runners can be varied.

8. A sled as claimed in claim 2 further comprising triangular hitch means detachably secured to said runners and including a swivel hitch for connecting the sled to a snow machine.

9. A shelter for ice fishing which is convertible to form the major elements of a sled comprising a two-section floor including means for permitting folding of one section of the floor onto the other section to produce a seat for the sled, a frame supported on said floor comprising first and second pairs of upright frame members, each said frame member including an elongate straight portion the free ends of which are detachably secured to said floor and a curved end portion, said frame members serving as runners for the sled and at least one pair of said frame members including means for detachably receiving support members for the sled seat; a connecting member including spaced, parallel tubular end portions the opposite ends of which detachably engage the free ends of the curved portions of said runners, and a removable covering which fits over said frame.

10. A convertible shelter as claimed in claim 9 wherein one of the sections of said floor includes a spearing or fishing hole therein, said floor further including four apertures, located at each of the corners thereof, in which said frame members are detachably received.

* * * * *